Feb. 15, 1927.

J. R. EAID 1,617,441

SPRING WHEEL

Filed Sept. 19, 1923

Inventor.
John R. Eaid.
by Parker & Carter
Attorneys.

Patented Feb. 15, 1927.

1,617,441

UNITED STATES PATENT OFFICE.

JOHN R. EAID, OF CHICAGO, ILLINOIS, ASSIGNOR TO THE PEOPLES TRUST AND SAVINGS BANK OF CHICAGO, TRUSTEE.

SPRING WHEEL.

Application filed September 19, 1923. Serial No. 663,545.

My invention relates to improvements in spring wheels and has for one object to provide a new and improved form of spring wheel wherein a plurality of different types of springs unite to provide a wheel which cushions a vehicle against both road shock and sudden engine power or brake application.

It will be noted that I provide first a central hub portion having a plurality of spring supported radially movable plungers, each plunger carrying rigidly attached thereto the inner ends of a group of flexible spokes, there being preferably four members in the group and these members being brought together to engage the plunger and being separated and diverging outwardly to engage the rim.

My machine is illustrated more or less diagrammatically in the accompanying drawings herein.

Like parts are indicated by like characters in the drawing.

Figure 1:
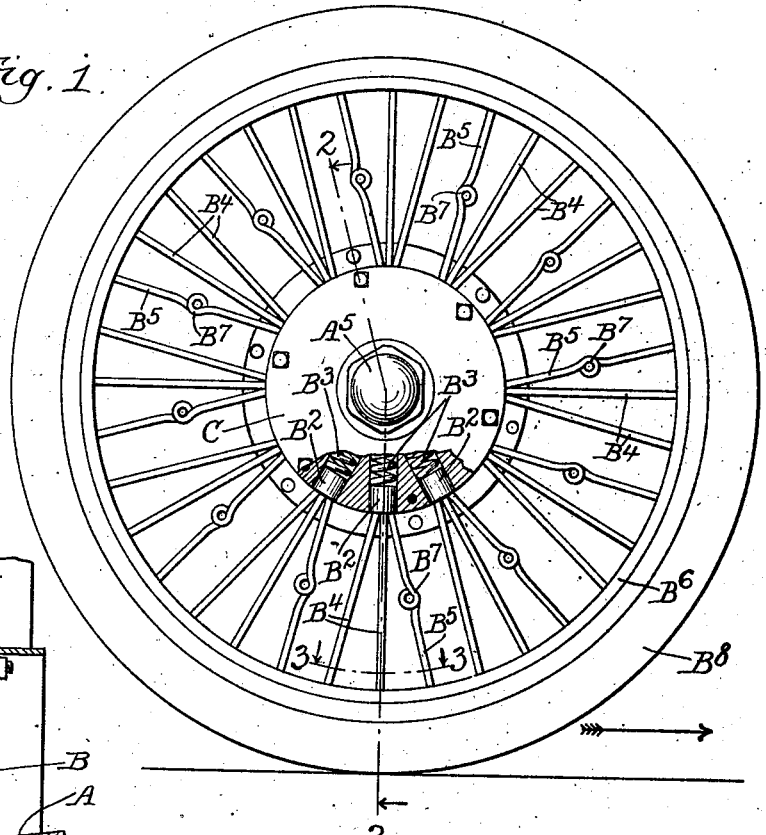
Fig. 1 shows a side elevation in part section of my wheel with parts removed.
Figure 2:
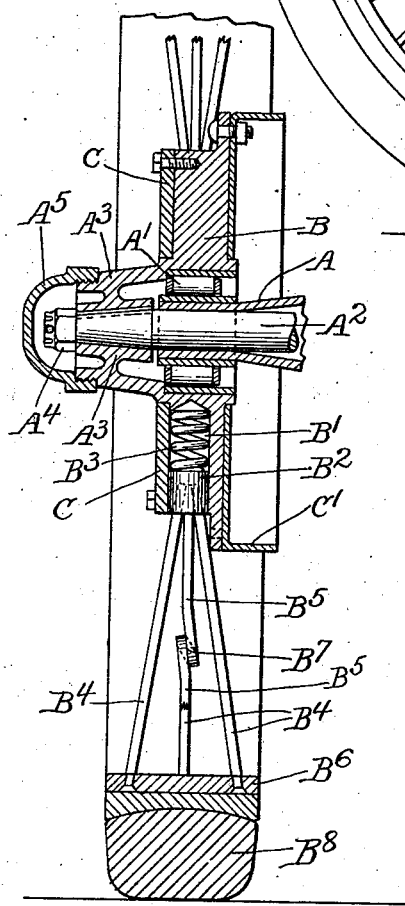
Fig. 2 is a section on an enlarged scale through Fig. 1 along the line 2—2.
Figure 3:
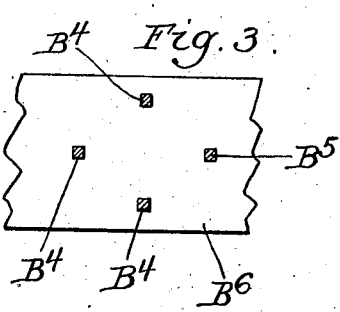
Fig. 3 is a section along the line 3—3 of Fig. 1.

I have illustrated my invention in connection with a rear wheel though it might equally well be used in connection with a front wheel.

A is the central axle housing extending outwardly from the vehicle as shown. It carries a roller bearing A' and is hollow to permit the floating axle or drive shaft A² to project outwardly therethrough and to engage the boss A³ on the wheel which is held in place on the shaft by means of a nut A⁴ enclosed by a hub cap A⁵.

B is the hub from which the boss A³ projects. This hub is mounted for rotation on the roller bearing A' and is radially drilled as at B'. B² are a series of abutments or pistons slidably mounted in the holes or guides B' and each outwardly pressed by the coil spring B³. B⁴, B⁵ are flexible spring spokes there being four of them mounted in each abutment B². These spokes diverge as indicated and terminate in the wheel rim B⁶ being spaced at their engagement with the rim in a diamond shape. One of the spokes B⁵ has disposed therein a single coil B⁷ and under some circumstances this may be dispensed with or it may be used in connection with more of the spokes. B⁸ is a rubber or other suitable road engaging tire.

C is a cover plate for the outer surface of the hub adapted to assist in positioning and assembling the plugs and springs. C⁷ is a brake drum attached to the inside of the hub.

It will be evident that while I have shown in my drawings an operative device still many changes may be made both in shape and arrangement of parts without departing materially from the spirit of my invention. I wish, therefore, that my drawings be regarded as in a sense diagrammatic.

The use and operation of my invention are as follows:

Parts are put together in the wheel, assembled in the shape and position shown in the drawings. When a load is put on the wheel each group of four or more diverging spring spokes is loaded and is under compression, the shape and arrangement being such that buckling or bending of the spokes is reduced to a minimum and so that the load is carried by the coil springs supporting the sliding abutments.

The flexible spokes are subject to bending resultant upon sudden acceleration of the vehicle, or braking action and under some circumstances it may be desirable to reinforce or supplement their cushioning of such stresses by the use of the single coil in the spoke as indicated though this coil may be dispensed with or may be found in more than one spoke of each group as the case may be.

I claim:

1. In a spring wheel a rim, a plurality of spring spokes and a sliding spring supported abutment interposed between the ends of said spokes and the center of the wheel, said spokes being arranged in groups, there being one abutment for each group, the spokes in each group diverging outwardly from the abutment to engage the wheel rim at spaced positions.

2. In a spring wheel a rim, a plurality of spring spokes and a sliding spring supported abutment interposed between the ends of said spokes and the center of the wheel, said spokes being arranged in groups there being one abutment for each group, the spokes in each group diverging outwardly from the abutment to engage the wheel rim at spaced positions, some of the spokes diverging from the plane of the wheel, others diverging from the radius along which the abutment travels.

3. A spring wheel comprising a hub, a plurality of radially disposed apertures therein, abutments mounted to slide in such apertures and compression springs interposed between them and the center of the hub, a wheel rim surrounding the hub and spaced therefrom and flexible straight spring spokes rigidly attached at one end to the abutment and at the other end to the wheel rim there being a group of outwardly diverging spokes attached to each abutment.

4. A spring wheel comprising a hub, a plurality of radially disposed apertures therein, abutments mounted to slide in such apertures and compression springs interposed between them and the center of the hub, a wheel rim surrounding the hub and spaced therefrom and flexible straight spring spokes rigidly attached at one end to the abutment and at the other end to the wheel rim there being a group of outwardly diverging spokes attached to each abutment, at least one spoke in each group having a spring twist turn.

Signed at Chicago, county of Cook and State of Illinois, this 1st day of September, 1923.

JOHN R. EAID.